United States Patent [19]
Spatafora

[11] Patent Number: 5,915,523
[45] Date of Patent: Jun. 29, 1999

[54] METHOD AND UNIT FOR ORDERING PRODUCTS

[75] Inventor: Mario Spatafora, Bologna, Italy

[73] Assignee: Azionaria Costruzioni Macchine Automatiche A.C.M.A. S.p.A

[21] Appl. No.: 08/852,393

[22] Filed: May 7, 1997

[30] Foreign Application Priority Data

May 8, 1996 [IT] Italy ................................ BO96A0254

[51] Int. Cl.⁶ ................................................ B65G 47/31
[52] U.S. Cl. .................................. 198/461.3; 198/461.1; 198/461.2; 198/493
[58] Field of Search .................. 198/461.1, 461.2, 198/461.3, 493, 633

[56] References Cited

U.S. PATENT DOCUMENTS

| | | | |
|---|---|---|---|
| 1,299,198 | 4/1919 | Thompson | 198/461.1 |
| 2,580,086 | 12/1951 | Fried | 198/633 |
| 3,348,655 | 10/1967 | Pierce, Jr. et al. | 198/461.3 |
| 3,523,603 | 8/1970 | Philips et al. | 198/461.3 |
| 3,667,622 | 6/1972 | Kamphues et al. | 198/461.1 |
| 3,721,330 | 3/1973 | Crawford et al. | 198/461.3 |
| 3,901,375 | 8/1975 | Raque | 198/461.3 |
| 3,908,333 | 9/1975 | Cavanna | 198/461.1 |
| 3,923,142 | 12/1975 | Rysti | 198/461.2 |
| 3,971,481 | 7/1976 | Longencker et al. | 198/461.1 |
| 4,077,524 | 3/1978 | Rysti | 198/491 |
| 4,124,113 | 11/1978 | Trees | 198/461.1 |
| 4,815,581 | 3/1989 | Deutschlander | 198/461.1 |
| 5,353,916 | 10/1994 | Lehmann | 198/461.1 |
| 5,641,053 | 6/1997 | Nannini et al. | 198/461.1 |

FOREIGN PATENT DOCUMENTS

| | | |
|---|---|---|
| 0608861 | 8/1984 | European Pat. Off. . |
| 0519400 | 12/1992 | European Pat. Off. . |
| 0572097 | 12/1993 | European Pat. Off. . |
| 2346407 | 3/1974 | Germany . |
| 3604806 | 8/1987 | Germany . |

OTHER PUBLICATIONS

Ferris, G.F. and Anzelone, Jr., T.A., "In–line substrate escapement," *IBM Technical Disclosure Bulletin*, 10(2):148 (Jul. 1967).

*Primary Examiner*—William E. Terrell
*Assistant Examiner*—Khoi H. Tran
*Attorney, Agent, or Firm*—Christensen, O'Connor, Johnson & Kindness PLLC

[57] ABSTRACT

A method and unit for ordering products, whereby the products, arranged with any timing, are timed as they are fed from a transfer station to a loading station through which gripping or loading elements travel at a given frequency and with a given timing; each product is fed at the transfer station into a respective supply pocket longer than the product and having a stop portion fed through the loading station with timing, and is moved inside the pocket by an air jet into a position contacting the stop portion.

10 Claims, 2 Drawing Sheets

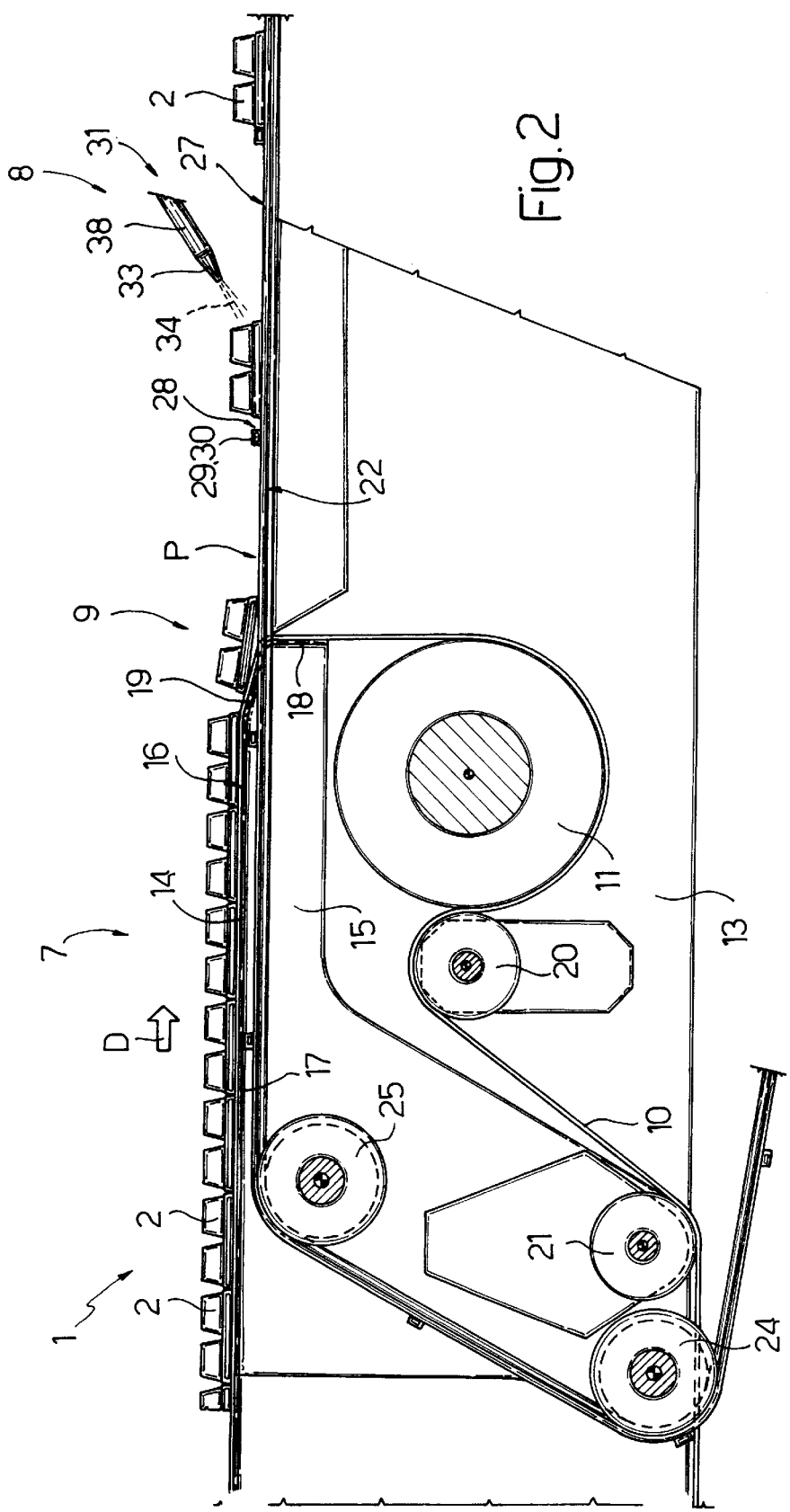

METHOD AND UNIT FOR ORDERING PRODUCTS

BACKGROUND OF THE INVENTION

The present invention relates to a method of ordering products.

More specifically, the present invention relates to a method of ordering products as they are fed onto a machine.

The present invention is particularly advantageous for use in the food packing industry, for packing products such as chocolates or similar, to which the following description refers purely by way of example.

In the food packing industry, products are supplied to a machine featuring an input conveying device having a number of conveying elements, which are fed at a given rate and with a given timing through a loading station where each receives a respective product.

The products are normally supplied in an orderly manner to the conveying device by means of a supply line, of which the conveying device forms the end element. Known supply lines normally comprise an ordering device for feeding a succession of products in a given traveling direction at said frequency, and for gradually bringing the products into contact with one another to form a continuous column of products for supply to a pickup station; and a transfer device extending between the pickup and loading stations, and which feeds the products to the loading station in time with said conveying elements.

The ordering device of known supply lines of the above type is normally defined by a conveyor belt, while the transfer device is normally defined by a wheel mounted for rotation about an axis crosswise to the traveling direction, and having a succession of equally spaced peripheral suction seats alternating with respective peripheral blow openings, and which are fed through the pickup and loading stations in time with the conveying elements. Each suction seat provides for engaging and removing the first product in the column from the pickup station in time with a respective conveying element, while the peripheral blow openings suspend removal of the products from the pickup station and temporarily arrest the whole column if the first product in the column is already located at the pickup station. As temporary stoppage of the column is not accompanied by a corresponding stoppage of the conveyor belt, this slides beneath and gradually damages the products.

To eliminate the above drawback, more recent transfer devices feature, in place of the suction seats, a number of orientable heads, each having a respective gripping element, and each orientable in relation to the traveling direction of the products by means of a control unit controlled by a photocell located at one end of the conveyor belt to detect transit of the products. On receiving a product transit signal, the control unit calculates the difference between the position of the product and the position of the respective gripping element in relation to the pickup station, and so orients the head as to advance or delay passage of the gripping element through the pickup station.

Though fairly efficient, orientable gripping heads of the type described are complex in design, expensive to produce, and require sophisticated operation control devices.

SUMMARY OF THE INVENTION

According to the present invention, there is provided a method of ordering products, designed to enable a precise systematic arrangement of the products with no damage to the products themselves, and which is straightforward and economical to implement.

According to the present invention, there is provided a method of ordering products as the products are supplied, in a given direction and along a given path, to a conveying device having a number of conveying elements movable through a loading station at a given frequency and with a given timing to each receive a respective product; the method comprising the steps of feeding said products successively at said frequency and with any timing up to a transfer station located upstream from said loading station in said direction; and transferring said products from the transfer station to the loading station at said frequency to feed the products to the loading station in time with respective conveying elements; the method being characterized in that said transfer step comprises the substeps of feeding each product into a respective supply pocket, the pocket having a given stop portion, and a dimension, measured in said direction, greater than a dimension of the products measured in the same direction; moving each product inside the respective pocket to position the product precisely at the respective stop portion; and feeding each stop portion through said loading station in time with the relative conveying element.

The present invention also relates to a unit for feeding products in an orderly manner to a machine.

According to the present invention, there is provided a unit for ordering products, the unit comprising supply means for feeding the products, in a given direction and along a given path, to a conveying device having a number of conveying elements movable through a loading station at a given frequency and with a given timing to each receive a respective product; conveying means for successively feeding said products at said frequency and with any timing up to a transfer station located upstream from said loading station in said direction; and transfer means for transferring said products from the transfer station to the loading station at said frequency, to feed the products to the loading station in time with respective conveying elements; the unit being characterized in that said transfer means comprise at least one supply pocket for receiving a respective product at the transfer station, the pocket having a given stop portion, and a dimension, measured in said direction, greater than a dimension of the products measured in the same direction; and actuating means for moving each product inside the respective pocket to precisely position the product at the respective stop portion; each stop portion being fed, in use, through said loading station in time with the relative conveying element.

BRIEF DESCRIPTION OF THE DRAWINGS

A non-limiting embodiment of the present invention will be described by way of example with reference to the accompanying drawings, in which:

FIG. 2 shows a larger-scale view of a detail in FIG. 1.

DETAILED DESCRIPTION OF THE INVENTION

Figure 1:
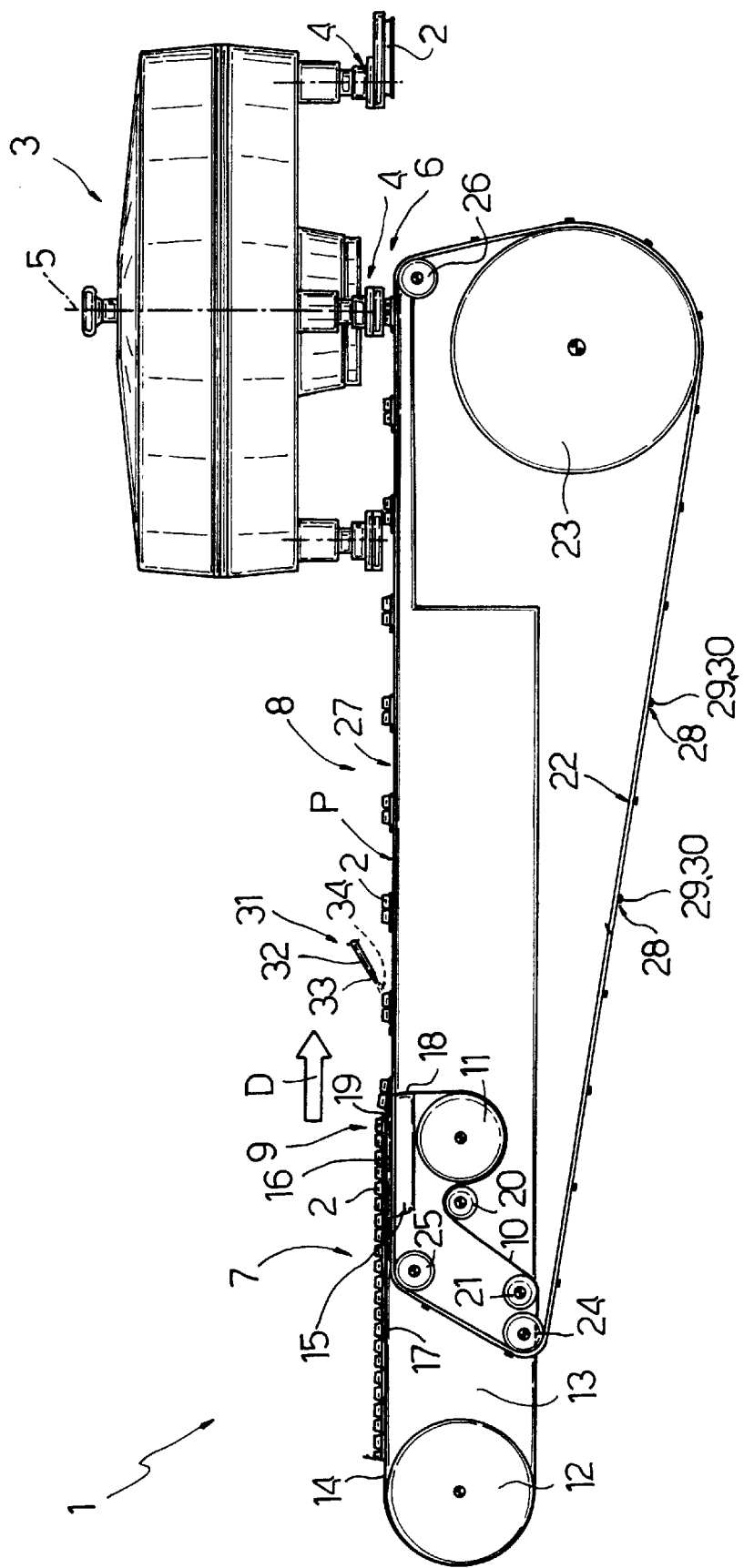
FIG. 1 shows a side view, with parts in section and parts removed for clarity, of a unit for ordering products in accordance with the teachings of the present invention.

Number 1 in FIG. 1 indicates a unit for ordering products 2 and for feeding products 2 to a conveying device 3 in a direction D and along a given path P. Conveying device 3 comprises a number of known gripping or loading heads 4 equally spaced about a vertical axis of rotation 5 of conveying device 3, and which are fed at a given frequency F and with a given timing J through a loading station 6.

Unit 1 comprises a supply device 7 and a transfer device 8 in series with each other along path P, and which cooperate with each other to feed products 2 along path P at frequency F to conveying device 3. More specifically, transfer device 8 receives products 2 from supply device 7 at a transfer station 9 located upstream from station 6 in direction D, and feeds each product 2 to station 6 in time with a respective gripping head 4. Device 7 receives products 2 from a known ordering device (not shown) for arranging products 2 substantially contacting one another, and feeds products 2 successively with any timing up to station 9.

Supply device 7 comprises a conveyor belt 10 narrower than products 2 so that the lateral end portions of products 2 project outwards of belt 10, and which is looped about a powered pulley 11 and an idle pulley 12, which are fitted in rotary manner to a frame 13 and define, on belt 10, a transportation branch 14 extending along path P up to station 9.

Device 7 also comprises a plate 15 extending beneath branch 14 between pulleys 11 and 12, and having a shaped upper profile 16 substantially contacting branch 14. More specifically, and as shown clearly in FIG. 2, profile 16 comprises an initial horizontal portion 17 aligned with a peripheral tangent of pulley 12; and a vertical end portion 18 aligned with a peripheral tangent of pulley 11 and connected to portion 17 by an inclined portion 19 located at station 9 so that transportation branch 14 slopes downwards in direction D. Finally, device 7 comprises a pair of takeup pulleys 20 and 21, the first of which is located outwards of belt 10, between pulleys 21 and 11 and close to pulley 11, and is fitted to frame 13 by means of a known elastic support (not shown).

Transfer device 8 comprises a pair of identical conveyor belts 22 (only one shown) located on either side of belt 10 and looped about four pairs of pulleys 23, 24, 25, 26 fitted in rotary manner to frame 13; pulleys 23 are integral with each other and define a single drive pulley for driving belts 22; pulleys 24 are located substantially at pulley 21, beneath transportation branch 14; pulleys 25 are located beneath portion 17 of plate 15, upstream from station 9 in direction D; and pulleys 26 are located at station 6, and define, on belts 22 and together with pulleys 25, respective horizontal transportation branches 27 extending along path P from station 9 to station 6, and lower than both branch 14 and gripping heads 4 of conveying device 3, so that: at station 9, branches 27 are located directly alongside a bottom end of inclined portion 19 of plate 15; and, at station 6, heads 4, in use, travel facing branches 27, and are located over branches 27 at a height substantially equal to a thickness of products 2.

Belts 22 comprise a number of supply pockets 28, each of which receives a respective product 2 at station 9 in such a manner that said lateral end portions of product 2 contact belts 22, and each of which comprises a dimension, measured in direction D, greater than a dimension of product 2 also measured in direction D. More specifically, each pocket 28 receives a respective product 2 with a variable amount of slack in direction D, and comprises a stop portion 29, which is fed through station 6 at frequency F and with timing J, hence in time with heads 4, and is defined by two projections 30 (only one shown) extending outwards from respective belts 22 and of a thickness less than the difference in the level of transportation branches 14 and 27 of belts 10 and 22 at station 9.

Finally, device 8 comprises brake means in the form of a positioning device 31 located over branch 27, upstream from station 6 in direction D, and for braking each product 2 to move the product 2 inside respective pocket 28 and into a position adjacent to projections 30, so that product 2 is supplied to station 6 in perfect time with relative gripping head 4.

More specifically, brake means 31 are pneumatic, and comprise a push element 32 defined by a nozzle 33 pointing in the opposite direction to the traveling direction of products 2, and connected to a known pneumatic device (not shown) to direct a jet 34 of air onto products 2 and move the products 2 inside respective pockets 28 into a position adjacent to and contacting projections 30.

Before going on to describe the operation of unit 1 in detail, it should be emphasized that the frequency F at which products 2 are fed along path P is imposed at all times by conveying device 3, which feeds heads 4 through station 6 at frequency F and at a given speed V having a component, in direction D, at least equal to a traveling speed V1 of pockets 28 along path P.

More specifically, transfer device 8 feeds pockets 28 through stations 9 and 6 at frequency F, so that each head 4 always receives a product 2 from respective pocket 28 at station 6, while supply device 7 feeds products 2 to station 9 at frequency F, so that each pocket 28 always receives a product 2. The operating frequency of unit 1 is adjusted according to any change in frequency F of conveying device 3 by means of a known control unit (not shown) commonly used for this purpose and connected to the drives of devices 3, 7 and 8.

In actual use, supply device 7 feeds products 2 successively and substantially continuously to station 9 at a speed V2 lower than speed V1, and feeds them to transfer device 8 at station 9 by transferring them from branch 14 directly into respective pockets 28. That is, since transportation branches 14 and 27 of respective belts 10 and 22 are located at different levels, and since branch 14 is guided by plate 15—in particular, by inclined portion 19 of plate 15—so as to be inserted between branches 27, device 7 feeds products 2 directly into pockets 28, at any point along pockets 28 with respect to respective projections 30.

More specifically, each product 2 is deposited gradually inside respective pocket 28. That is, inclined portion 19, which is of a length equal to said dimension of product 2 measured in direction D, ensures product 2 contacts belts 22 before projections 30 reach station 9. As such, on contacting belts 22, product 2 is not only accelerated from speed V2 to speed V1, but is also distanced from the following product 2 to enable relative projections 30 to be positioned between the two products 2. The distance, measured in direction D, between two adjacent products 2 on branches 27 inside pockets 28 is therefore greater than the distance, measured in direction D, between two products 2 on branch 14.

Once each product 2 is inserted completely inside respective pocket 28 with said lateral end portions contacting belts 22, product 2 is fed by belts 22 beneath positioning device 31, and is gradually subjected to air jet 34 emitted by nozzle 33. Air jet 34 brakes product 2 and acts as a push element to push product 2, inside respective pocket 28, into a position against respective projections 30, so that product 2 is positioned precisely at projections 30 and therefore timed with respect to heads 4.

At this point, transfer device 8 feeds products 2 to station 6, where heads 4 of conveying device 3 receive products 2 and transfer them from station 6 to the input of a machine (not shown), e.g. a wrapping machine.

Given the high speed of belts 22 and the soft air jet 34 to which each product 2 is subjected, the small amount of slippage of said end portions of each product 2 along belts 22 as product 2 is positioned against respective projections 30 in no way damages the outer surface of product 2. What is more, as will be clear from the foregoing description, unit 1 provides for timing products 2 with respect to heads 4 in a straightforward and particularly effective manner with no need for sophisticated control systems.

According to a variation (not shown) of unit 1, push element 32 of brake means 31 is replaced by a pneumatic plate located upstream from station 6 in direction D, between branches 27, and having a number of holes connected to a pneumatic device for forming. an air cushion over the plate to detach products 2 slightly from belts 22. The loss in speed of products 2 with respect to belts 22 during detachment moves products 2 gradually inside respective pockets 28 to position products 2 against respective projections 30.

In a further variation (not shown) of unit 1, pneumatic brake means 31 are replaced by friction brake means, and push element 32 is replaced by a straightforward fixed plate located upstream from station 6 in direction D and along path P between branches 27. The upper surface of the fixed plate is located at a slightly higher level than branches 27, so as to detach products 2 from belts 22 at that point along path P, cause a loss in speed of products 2 as they slide along the upper surface, and so position products 2 correctly against respective projections 30.

I claim:

1. A method of ordering products (2) as the products (2) are supplied, in a given direction (D) and along a given path (P), to a conveying device (3) having a number of conveying elements (4) movable through a loading station (6) at a given frequency (F) and with a given timing (J) to each receive a respective product (2); the method comprising the steps of feeding said products (2) successively at said frequency (F) and with any timing up to a transfer station (9) located upstream from said loading station (6) in said direction (D); and transferring said products (2) from the transfer station (9) to the loading station (6) at said frequency (F) to feed the products (2) to the loading station (6) in time with respective conveying elements (4); said transfer step comprising the substeps of feeding each product (2) into a respective supply pocket (28), the pocket (28) having a given stop portion (29), and a dimension, measured in said direction (D), greater than a dimension of the products (2) measured in the same direction (D); moving each product (2) inside the respective pocket (28) to position the product (2) precisely at the respective stop portion (29) by braking the product (2) via brake means located between the transfer and loading stations (9, 6) and which comprise pneumatic brake means (31) which emit an air jet (34) to move each product (2) in relation to the respective pocket (28) to a position adjacent the stop portion (29); and feeding each stop portion (29) through said loading station (6) in time with the relative conveying element (4).

2. A method as claimed in claim 1, characterized in that said pneumatic brake means (31) comprise a nozzle (33) for emitting said air jet (34), the nozzle (33) being aimed in an opposite direction to said direction (D) of the products (2).

3. A method as claimed in claim 1, wherein said transfer step comprises the substep of accelerating each product (2) as the product (2) is fed into the respective pocket (28).

4. A unit (1) for ordering products (2) the unit (1) comprising conveying means (7) for feeding the products (2), in a given direction (D) and along a given path (P), to a number of gripping heads (4) movable at a given frequency (F) and with a given timing (J) to each receive a respective product (2); and transfer means (8) for transferring said products (2) from the conveying means (7) to the gripping heads (4) at said frequency (F), to feed the products (2) to the gripping heads (4); said transfer means (8) comprising at least one supply pocket (28) for receiving a respective product (2) at the transfer station (9), the pocket (28) having a given stop portion (29), and a dimension, measured in said direction (D), greater than a dimension of the products (2) measured in the same direction (D); and brake means for moving each product (2) inside the respective pocket,(28) to precisely position the product (2) at the respective stop portion (29); each stop portion (29) being fed, in use, through said loading station (6) in time with the relative conveying element (4); said brake means being located above said conveying means before said gripping heads (4) to brake said product (2) and move the product (2) inside the pocket (28) adjacent the stop portion (29), and comprising pneumatic brake means (31) emitting an air jet (34) to move each product (2) into a position adjacent the stop portion (29) of the pocket (28).

5. A unit as claimed in claim 4, wherein said pneumatic brake means (31) comprise a nozzle (33) for emitting said air jet (34), the nozzle (33) being aimed in an opposite direction to said direction (D) of the products (2).

6. A unit as claimed in claim 4, wherein said conveying means (7) comprise a conveyor belt (10) having a transportation run (14) extending along said path (P) to said transfer station (9); said transfer means (8) comprising two further conveyor belts (22) located on either side of said belt (10) at least at the transfer station (9).

7. A unit as claimed in claim 6, wherein said further conveyor belts (22) comprise respective further transportation runs (27) extending through said transfer station (9) and said loading station (6); said transportation run (14) being located at a higher level than said further transportation runs (27), and being inserted between the further transportation runs (27) at said transfer station (9).

8. A unit as claimed in claim 7, wherein said transportation run (14) comprises an inclined portion (19) at said transfer station (9).

9. A unit as claimed in claim 8, said inclined portion (19) slopes downwards in said direction (D).

10. A unit as claimed in claim 6, wherein said stop portion is defined by a projection (30) for each of said further conveyor belts (22).

* * * * *

UNITED STATES PATENT AND TRADEMARK OFFICE
CERTIFICATE OF CORRECTION

PATENT NO. : 5,915,523
DATED : June 29, 1999
INVENTOR(S) : M. Spatafora

It is certified that error appears in the above-identified patent and that said Letters Patent is hereby corrected as shown below:

| COLUMN | LINE | |
|---|---|---|
| 3 | 31 | "dow nwards" should read --downwards-- |
| 5 | 14 | After "forming" delete "." |
| 6 (Claim 4, line 1) | 8 | After "products (2)" insert --,-- |
| 6 (Claim 4, line 15) | 21 | "pocket,(28)" should read --pocket (28)-- |
| 6 (Claim 9, line 1) | 52 | After "claim 8," insert --wherein-- |

Signed and Sealed this

Eighteenth Day of January, 2000

Attest:

Attesting Officer

Q. TODD DICKINSON

Commissioner of Patents and Trademarks